United States Patent [19]

Albers

[11] 4,051,813

[45] Oct. 4, 1977

[54] LOCKING STANCHION FOR CATTLE

[76] Inventor: Teunis Albers, 18007 Arline Ave., Artesia, Calif. 90701

[21] Appl. No.: 613,169

[22] Filed: Sept. 15, 1975

[51] Int. Cl.² .............................................. A01K 1/00
[52] U.S. Cl. .................................................... 119/148
[58] Field of Search ............... 119/148, 147, 149, 155, 119/98, 99; 24/206 B, 201 D, 231 AV

[56] References Cited

U.S. PATENT DOCUMENTS

| 549,965 | 11/1895 | Howard | 119/148 |
|---|---|---|---|
| 1,072,352 | 9/1913 | Neller | 119/148 |
| 1,081,045 | 12/1913 | James | 119/148 |
| 1,275,034 | 8/1918 | Huxley | 24/201 D |
| 1,642,278 | 9/1927 | Vanderlipp | 24/201 D |
| 3,397,432 | 8/1968 | Banas | 24/230 AV |

FOREIGN PATENT DOCUMENTS 920,692  11/1954  Germany ............................ 119/148

Primary Examiner—Jay N. Eskovitz
Attorney, Agent, or Firm—Fulwider, Patton, Rieber, Lee & Utecht

[57] ABSTRACT

A locking stanchion for cattle in which a plurality of release rails are pivotally mounted at their lower ends on a bottom rail and connected at their upper ends to a reciprocally mounted master release rod for simultaneous movement between a vertical closed position and a slightly angular open position. A release bracket removably connects the upper end of each of the release rails to the master release rod for selective opening of any of the release rails while the others remain in closed position. The release bracket has one end thereof pivotally connected to the upper end of the release rail and the opposite end has a portion removably extending into an opening in the master release rod. A manually releasable mechanism which may include a spring maintains the bracket in engagement with the release rod.

3 Claims, 17 Drawing Figures

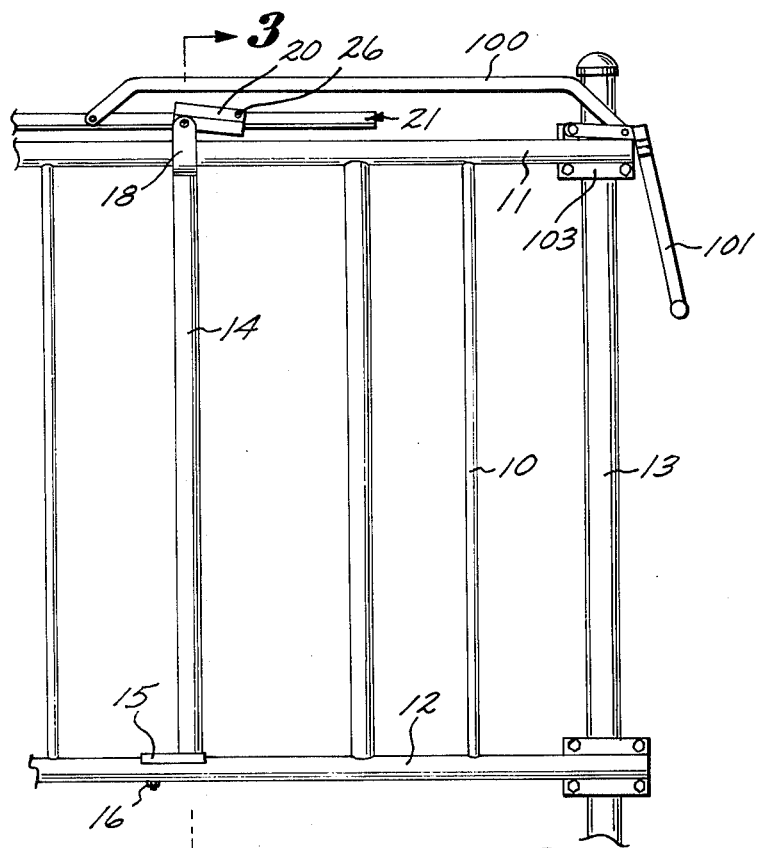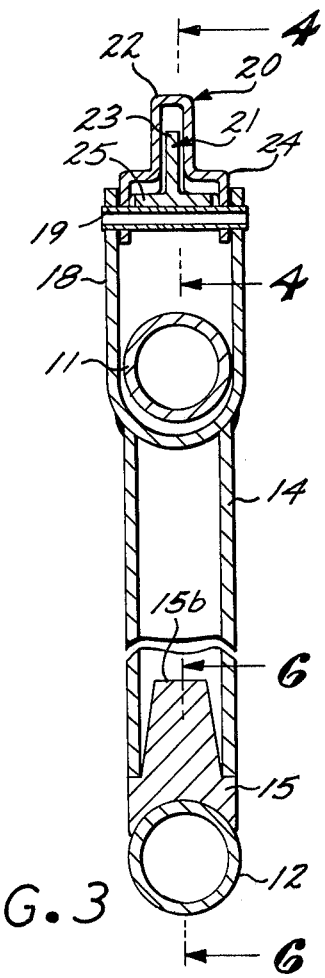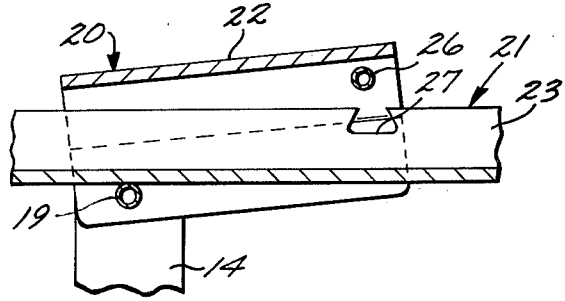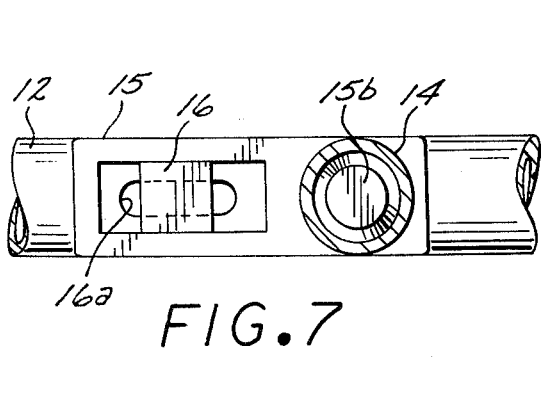

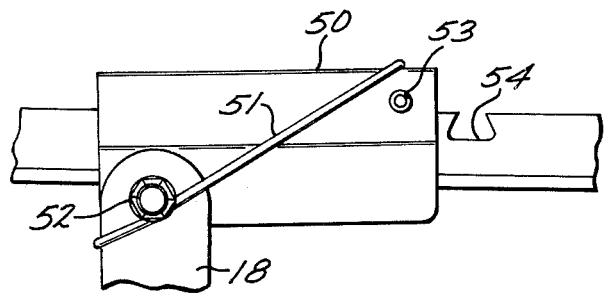
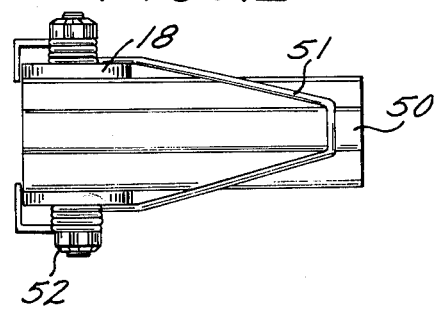
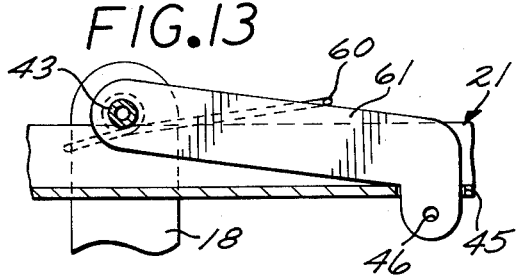
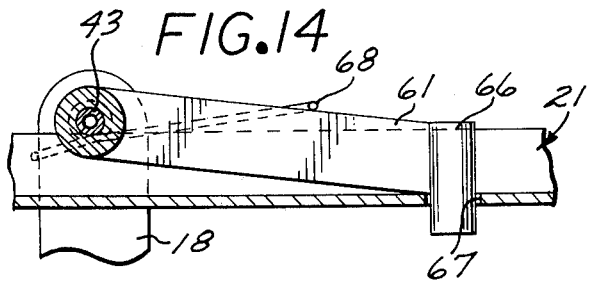
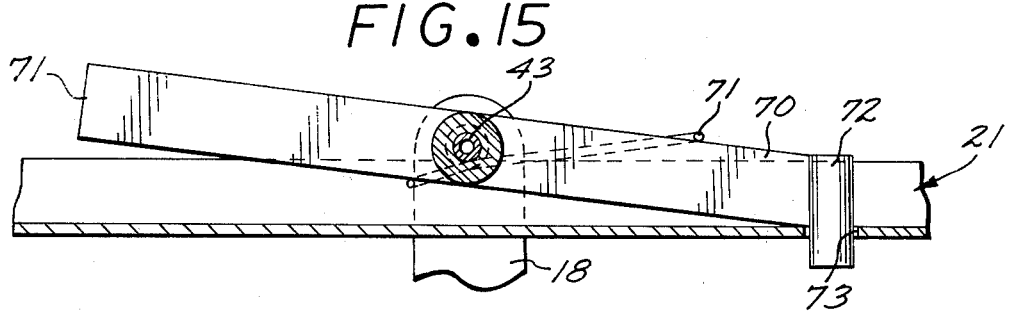
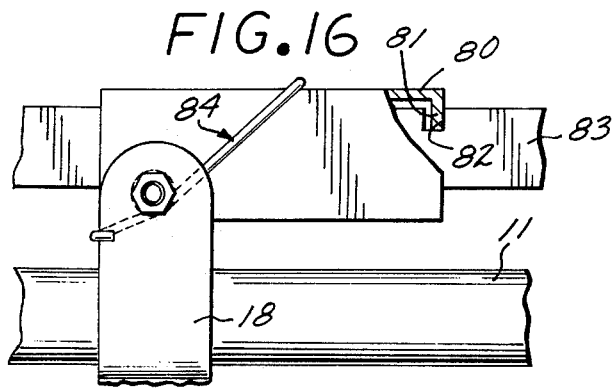
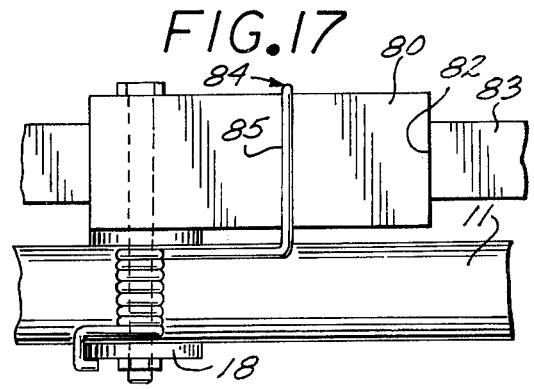

4,051,813

LOCKING STANCHION FOR CATTLE

BACKGROUND OF THE INVENTION

1. Field of the Invention

The invention relates to a locking stanchion for cattle.

2. Description of the Prior Art

The prior art discloses various types of locking stanchions for cattle which do not provide the desired cetainty of operation in holding a plurality of cattle, with easy rapid release of one or more of the cattle while the others remain locked in the stanchion.

SUMMARY OF THE INVENTION

The invention provides for use in a locking stanchion a release bracket for a release rail which normally securely engages the master release rod during its movement between open and closed positions. Spring means may be used to hold the release bracket in engagement with the master release rod. The release bracket is adapted to be manually disengaged from the master release rod for selective opening of one or more stalls while the other stalls remain closed.

The invention provides simple and effective means for connecting the release brackets to the master release rod and for manually opening any one or more while the remainder stay closed.

DESCRIPTION OF THE DRAWINGS

FIG. 2 is an elevational view of the end portion in closed position;

FIG. 3 is a sectional view of the same taken on line 3—3 of FIG. 2;

FIG. 4 is a sectional view of the release bracket taken on line 4—4 of FIG. 3;

FIG. 5 is an identical view with the release bracket in open position;

FIG. 6 is a sectional view of the connection between the release rail and bottom rail taken on line 6—6 of FIG. 3;

FIG. 7 is a plan view of the same taken on line 7—7 of FIG. 6;

FIG. 11 is a side elevational view of another embodiment of release bracket in open position;

FIG. 12 is a top plan view of the release bracket shown in FIG. 11, with the master release rod omitted;

FIG. 13 is a sectional view showing another embodiment of release bracket;

FIG. 14 is a sectional view of still another embodiment of release bracket;

FIG. 15 is a sectional view of yet another embodiment of release bracket;

FIG. 16 is a side elevational view of another embodiment of release bracket partly broken away and shown in section.

FIG. 17 is a top plan view of the release bracket shown in FIG. 16.

DESCRIPTION OF THE PREFERRED EMBODIMENT

Figure 1:
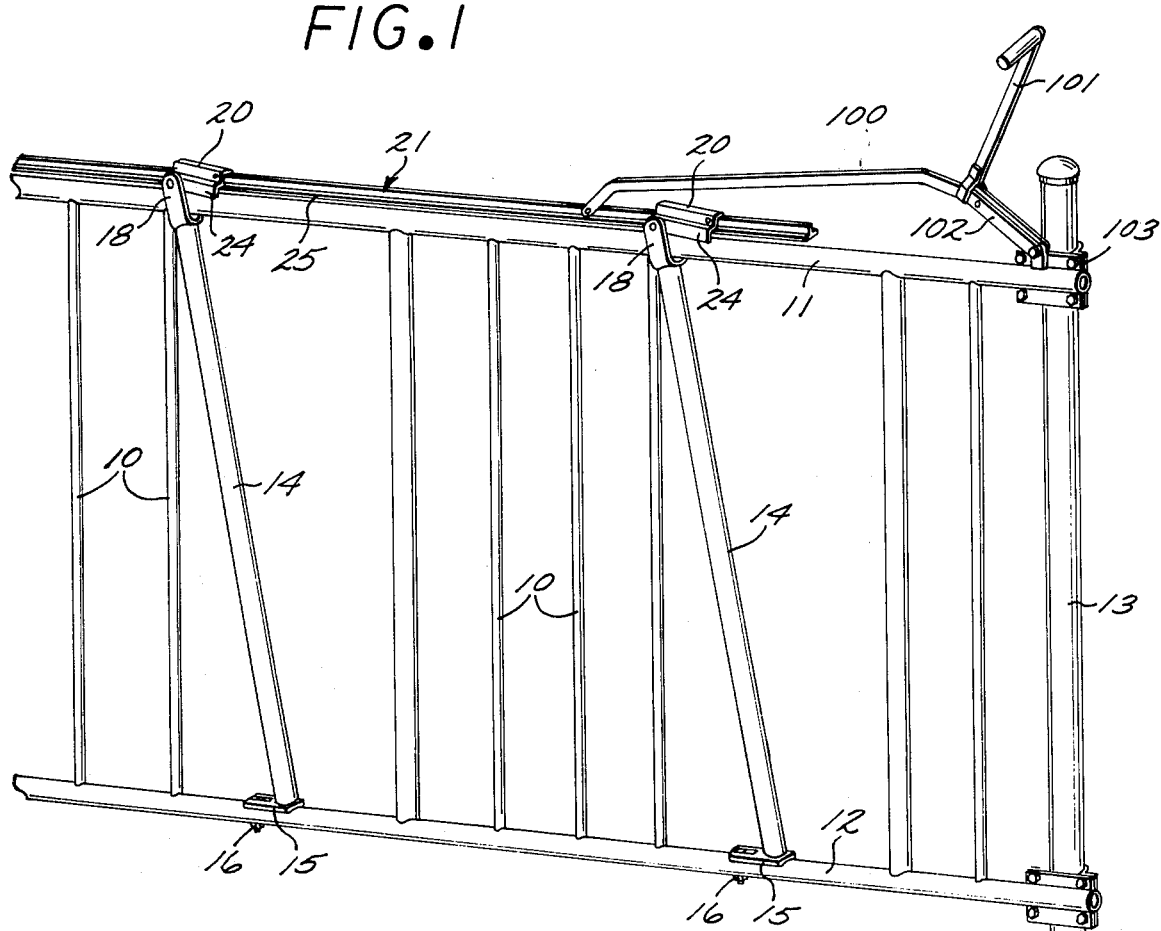
FIG. 1 is a perspective view of one end of a cattle stanchion in open position.

A first preferred embodiment which has been selected to illustrate the invention comprises a stanchion structure of the type in which a plurality of fixed spaced bars and/or rods 10 extend vertically between a tubular top rail 11 and a tubular bottom rail 12. The stanchion structure is supported by a plurality of spaced tubular vertical rails 13 which are secured to the ground at their lower ends.

A plurality of tubular release rails 14 are pivotally mounted at their lower ends on brackets 15 which are mounted on the bottom rail 12 by bolts 16. Slots 16a are provided for lateral adjustment of the positioning of the lower ends of the brackets 15. Each bracket 15 is provided with an upwardly directed frusto-conical projection 15b which fits within the lower end of the release rail 14.

This arrangement permits a limited degree of pivotal movement of the release rail 14 with respect to the bracket 15. The release rails 14 are accordingly adapted to pivot between the vertical closed position shown in FIG. 2 of the drawings and the angular open position shown in FIG. 1 of the drawings.

The upper end of each of the release bars 14 is fixedly connected to the bottom of a U-shaped member 18, which slidably extends around the top rail 11. The upper ends of the U-shaped member 18 are pivotally connected to the opposite ends of a hollow horizontally directed pin 19. The pin 19 extends transversely across the top of the top rail 11.

The pin 19 is fixedly secured adjacent to its ends to the opposite sides of the lower portion of one end of a release bracket 20. The release bracket 20 straddles an inverted T-shaped master release rod 21, which extends horizontally parallel to and slightly above the top rail 11. The master release rod 21 is mounted for sliding horizontal movement between the open position shown in FIG. 1 of the drawings and the closed position shown in FIG. 2 of the drawings, normally carrying with it all of the release brackets 20.

The upper portion of each release bracket 20 is formed complementarily to the master release rod 21, with a narrow inverted U-shaped upper end 22 which slidably fits around the vertical portion 23 of the master release rod 21. The release bracket 20 then flares outwardly to a wider portion 24 which slidably extends around the bottom 25 of the master release rod 21, as best shown in FIG. 3 of the drawings.

The release bracket 20 is normally connected to the master release rod 21 by a pin 26 which extends transversely across the narrow upper end 22 of the release bracket 20. The pin 26 fits within an upwardly opening detent or opening 27 formed in the vertical portion 23 of the master release rod 21. As seen in the drawings, the opening 27 includes opposite undercut extremities preventing upward movement of the pin 26.

When the master release rod 21 is disposed in closed position, the user may desire to open one stall of the stanchion. FIG. 4 of the drawings shows the release bracket 20 in its normal closed position. As the master release rod 21 is reciprocated, the pin 26 moves horizontally across the bottom of the keyhole opening 27. The release bracket 20 may be moved manually to either side to move the pin 26 away from the undercut extremities to the center of the opening 27. The end of the release bracket 20 may then be pivoted upwardly as shown in FIG. 5, and the release rail 14 may then be tilted to open position to free one stall while the others remain closed.

Figure 8:
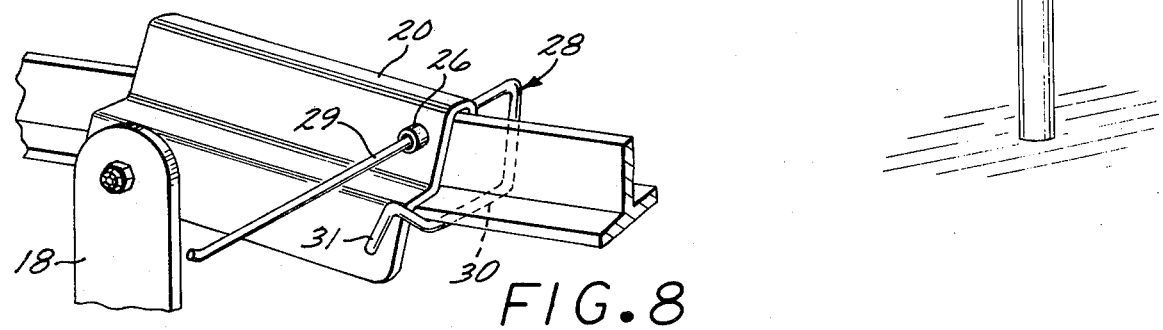
FIG. 8 is a perspective view of an alternative embodiment of the release bracket using a spring clip.

FIG. 8 of the drawings shows the same release bracket 20, with the addition of a spring clip 28. The spring clip 28 has a horizontally directed straight upper leg 29 which slidably and removably extends through the pin 26, which is hollow. The spring clip 28 is bent to form an integral shorter lower leg 30 which extends across the bottom 25 of the master release rod 21. The spring clip 28 is resilient and has an integral upwardly bent hook portion 31 at the end of the lower leg 30 which flexes to permit the clip 28 to be removably mounted and removed and which engages one edge of the bottom 25 of the remote release rod 20.

As long as the spring clip 28 remains in place, the release bracket 20 remains secured to the master release rod 21. In order to open the release bracket 20, the user must first remove the spring clip 28.

Figure 9:
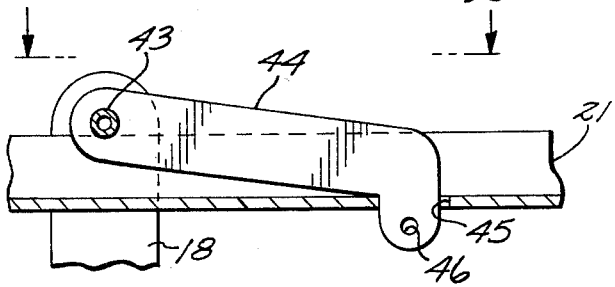
FIG. 9 is a sectional view of another alternative embodiment of release bracket.
Figure 10:
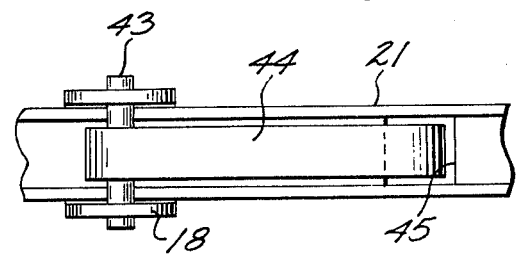
FIG. 10 is a plan view of the same, taken on line 10—10 of FIG. 9.

FIGS. 9 and 10 show an alternative embodiment of the invention in which the master release rod 21 is U-shaped. The release bracket comprises an arm 42 pivotally mounted at one end thereof on a pin 43, the other end being downwardly directed and adapted to extend through a detent or opening 45 in the bottom of the release rod 21. A pin or other locking device not shown in the drawing may be removably mounted through a hole 46 in the lower end 44 of the arm 42.

FIGS. 11 and 12 show another alternative embodiment in which the release bracket 50 is shaped in a manner similar to the first embodiment of the invention described above. A bias means or spring 51 which is connected at its opposite ends to the opposite ends of a bolt 52 extends across the top of the release bracket 50. The spring 51 forces a pin 53 carried by the end of the bracket 50 downwardly into a keyhole shaped detent or opening 54 formed in the top of the master release rod 55.

FIG. 13 shows another embodiment which is identical with the one shown in FIG. 9, except for the addition of a bias means or spring 60 which forces the arm 61 downwardly.

FIG. 14 shows another embodiment which is similar to FIG. 13, except that the end of the arm 61 carries a solid circular rod 66 which fits into a circular detent or opening 67. A bias means or spring 68 urges the rod 66 downwardly into the opening 67.

FIG. 15 shows another embodiment which is identical with FIG. 14, except that the arm 70 is provided with a free end 71a for use in pivotally raising the rod 72 out of the detent or opening 73. A bias means or spring 71 holds the rod 72 in the opening 73.

FIGS. 16 and 17 show another embodiment in which a pivotally mounted lever arm 80 is closed on three sides. A fourth side is provided with a downwardly directed flange 81 which fits within an elongated detent or opening 82 which extends transversely across the top of the master release rod 83. A bias means or spring 84 has a straight end portion 85 which extends transversely across the top of the arm 80 and which urges the flange 81 downwardly into the opening 82.

As shown in FIGS. 1 and 2 of the drawings, one end of the master release rod 21 is connected to a locking handle assembly for locking the master release rod 21 in closed position. An elongated bar 100 is pivotally connected at one end thereof to the master release rod 21. A manually operable handle 101 is fixedly connected adjacent to the opposite end of the bar 100. The end of the bar 100 adjacent to the handle 101 is pivotally connected to one end of a link 102, the opposite end of which is pivotally connected to a bracket 103 which is fixedly secured to the end bar 13.

When the master release rod 21 is in open position, as shown in FIG. 1 of the drawings, the link 102 extends angularly upwardly away from the bracket 103 and the handle 101 is directed upwardly. Downward movement of the handle 101 moves the elongated bar 100 and master release rod 21 horizontally toward the end bar 13.

In closed position, as shown in FIG. 2 of the drawings, the link 102 extends horizontally across the bracket 103 and the handle 101 extends substantially downwardly. The master release rod 21 is thereby securely held in closed position until the handle 101 is moved upwardly to release it.

I claim:

1. In a cattle locking stanchion of the type in which a plurality of substantially vertically extending release rails are pivotally mounted at their lower ends on a bottom rail, extend above a top rail, and are associated at their upper ends with a horizontally extending, reciprocally mounted master release rod located above said top rail and operative for simultaneous movement of all said release rails between a vertical closed position and a slightly angular open position, the improvement comprising: a horizontally elongated release bracket for each of said release rails, each said release bracket having one end thereof pivotally connected to the upper end of one of said release rails for movement about a transverse pivot axis, the opposite end of said release bracket having a portion comprising a transverse pin removably received in an upwardly opening detent provided in said master release rod, said detent including opposite undercut extremities for receiving said pin and preventing said pin from moving upwardly whereby said pin must be generally centrally located in said detent for upward movement, and bias means carried by said upper end of said one of said release rails and engaged upon said release bracket and urging said pin downwardly into said detent whereby all of said release rails are movable between said open and closed positions upon reciprocation of said master release rod, each said release bracket being manually upwardly pivotable against the bias of said bias means whereby the associated one of said release rails is pivotable independently of the others of said release rails.

2. In a cattle locking stanchion of the type in which a plurality of substantially vertically extending release rails are pivotally mounted at their lower ends on a bottom rail, extend above a top rail, and are associated at their upper ends with a horizontally extending, reciprocally mounted master release rod located above said top rail and operative for simultaneous movement of all of said release rails between a vertical closed position and a slightly angular open position, the improvement comprising: a horizontally elongated release bracket for each of said release rails, each said release bracket having one end thereof pivotally connected to the upper end of one of said release rails for movement about a transverse pivot axis, the opposite and of said release bracket having a first portion removably received in an upwardly opening detent provided in said master release rod, the weight of said first portion urging said first portion downwardly into said detent whereby all of said release rails are movable between said open and closed positions upon reciprocation of said master release rod, each said release bracket being manually upwardly pivotable whereby the associated one of said release rails is pivotable independently of the others of said release rails, each said detent including opposite undercut extremities for receiving said first portion and preventing said first portion from moving upwardly whereby said first portion must be generally centrally located in said detent for upward movement.

3. The cattle locking stanchion improvement of claim 2 wherein said release bracket includes a second portion located on the side of said pivot axis opposite said first portion, said second portion being engageable with said master release rod to limit the degree of upward pivotal movement of said first portion whereby said first portion is adapted to pivot back toward said detent in the absence of manual actuation upwardly.

* * * * *